US00RE49995E

(19) United States
(12) Reissued Patent
Pieper Genannt Schmauck

(10) Patent Number: US RE49,995 E
(45) Date of Reissued Patent: Jun. 4, 2024

(54) TRAMPOLINE AND HOOK ELEMENT FOR TRAMPOLINE

(71) Applicant: Bellicon AG, Lucerne (CH)

(72) Inventor: Heinz-Konrad Pieper Genannt Schmauck, Cologne (DE)

(73) Assignee: Bellicon AG, Lucerne (CH)

(21) Appl. No.: 17/513,364

(22) Filed: Oct. 28, 2021

Related U.S. Patent Documents

Reissue of:
(64) Patent No.: 8,038,580
Issued: Oct. 18, 2011
Appl. No.: 12/305,327
PCT Filed: Jun. 16, 2007
PCT No.: PCT/EP2007/005317
§ 371 (c)(1),
(2) Date: Dec. 17, 2008
PCT Pub. No.: WO2007/147534
PCT Pub. Date: Dec. 27, 2007

(30) Foreign Application Priority Data

Jun. 19, 2006 (DE) ..... 102006028363

(51) Int. Cl.
*A63B 5/11* (2006.01)
*F16B 5/06* (2006.01)
*A63B 21/055* (2006.01)

(52) U.S. Cl.
CPC ..... *A63B 5/11* (2013.01); *A63B 21/0552* (2013.01); *F16B 5/0692* (2013.01)

(58) Field of Classification Search
CPC ..... A63B 5/11; A63B 21/0552; F16B 5/0692
See application file for complete search history.

(56) References Cited

U.S. PATENT DOCUMENTS 2,991,841 A * 7/1961 Sampson et al. ..... 482/27
2009/0206621 A1* 8/2009 Payne ..... 294/158

FOREIGN PATENT DOCUMENTS

| | | | |
|---|---|---|---|
| DE | 2504875 | A1 | 8/1976 |
| DE | 8805500 | U1 | 7/1988 |
| DE | 29919912 | U1 | 1/2000 |
| DE | 299 19 912 | U1 | 2/2000 |
| DE | 10226707 | A1 | 1/2004 |
| EP | 0791375 | A1 | 8/1997 |
| EP | 2035096 | B1 | 3/2013 |
| FR | 2541099 | * | 2/1984 |
| FR | 2541099 | A1 | 8/1984 |
| GB | 2123280 | A | 2/1984 |

* cited by examiner

*Primary Examiner* — William E Dondero
(74) *Attorney, Agent, or Firm* — Boyle Fredrickson S.C.

(57) ABSTRACT

A trampoline includes a frame and a jumping bed which preferably has hook elements on its underside. The jumping bed is connected to the frame via a plurality of annular strap sections, which each extend at least partially around the frame and are inserted into the hook elements. The hook elements have a first receiving section and a second receiving section. These are arranged separated from one another in such a way that the two loop ends of the strap section, which are produced by the looping of the strap section around the frame and are inserted into the hook element, do not, or substantially do not, come in contact with one another. This structure considerably extends the life in comparison with conventional trampolines.

33 Claims, 2 Drawing Sheets

TRAMPOLINE AND HOOK ELEMENT FOR TRAMPOLINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

The invention relates to a trampoline with a base, which includes a frame, and with a jumping sheet, which preferably includes hook elements on its underside, the jumping sheet being connected to the frame by means of a plurality of annular strap sections, which each extend at least partially around the frame and are secured to the hook elements. The invention is also directed to a hook element for trampolines.

Trampolines are widely used in physiotherapy and in the leisure area.

In the case of so-called mini-trampolines, a distinction is made between trampolines with a spring suspension and a rubber strap ring suspension. In the case of a spring suspension, the jumping sheet is secured to the frame by means of spiral springs. Such a suspension makes considerable acceleration forces available and is thus suitable, in particular, for sports training with high demands on the cardiovascular system.

In the case of a rubber strap ring suspension, one or more elastic straps or strap sections are used, which connect the jumping sheet to the frame. The larger elasticity of such a fastening produces "softer" deceleration of the body and is thus primarily suitable in the case of joint and back problems, in rehabilitation, for relaxation and combating stress and for children.

Only a single elastic strap was originally provided in strap suspensions, see for example DE 299 19912 U1. The strap is wound alternately about the frame of the trampoline and pulled through loops arranged on the underside of the jumping sheet. It has, however, transpired in practice that the known trampoline has disadvantages in operation. Thus the fastening of the jumping sheet to the frame is perceived to be complex. Furthermore, tilting of the jumping sheet with respect to the frame can occur in use. In particular, however, the entire strap must be replaced if only one point on the strap is abraded or worn.

There has therefore been a move to suspending the jumping sheet on a plurality of annular strap sections, which are preferably fastened to the underside of the jumping sheet and are looped around the frame. Such a trampoline is disclosed in, for instance, DE 102 26707 B4 emanating from the applicant. By contrast with the suspension of the jumping sheet with only a single strap, the individual strap suspension combines a number of advantages. Above all, the durability is significantly increased. Furthermore, replaceability is also better (and cheaper). If a strap section is worn, it is simply replaced individually. The other strap sections remain untouched. Finally, the individual strap suspension always ensures correct centering of the jumping sheet.

The individual strap suspension has basically proved to be satisfactory. There is, however, the endeavour to improve the known trampoline. This applies, in particular, with regard to the wear resistance of the suspension.

BRIEF DESCRIPTION

Starting from the known prior art, it is the object of the invention to improve the durability of the known trampoline whilst maintaining the good handling.

In order to solve this object, the trampoline referred to above is characterised in accordance with the invention that the hook elements have a first receiving section and a second receiving section, which are arranged separated from one another such that the two loop ends of the strap section, which are formed by the looping of a strap section around the frame and are inserted into the hook element, do not, or substantially not, contact one another.

The invention is based on the recognition that relative movement occurs between the hook elements and the strap sections or between the loop ends relative to one another, which can result in premature destruction of the strap ring. Particularly in the case of strap rings with a sheath of e.g. a textile or plastic braid, as are commonly nowadays used, there is the risk of damage by rubbing. In accordance with the invention, in order to prevent this relative movement, two separate receiving sections are provided on the hook element, which receive a respective loop end and ensure that the loop ends to not contact one another. The increase in the service life is considerable.

Reference is made at this point to the fact that in the loading and/or unloading phase, it can occur that the loop ends contact one another slightly but this contact is negligible. This case is intended to be embraced by the invention.

The first receiving section and the second receiving section (in the main tension direction of the strap section in question) are preferably arranged substantially at the same height. Such a construction ensures that the two loop ends are stretched to the same extent in the event of tensional loading of the strap section so that the strap ring thus experiences no relative movement between its loop ends. An arrangement of the receiving sections at substantially the same height further has the advantage that any relative movements between the frame and the strap section can be kept minimal.

A further advantageous feature for minimising wear and thus increasing the service life is characterised in that the cross-section in the region of the receiving sections is of part-circular rounded shape and preferably has an angle of at least 160°, particularly ca. 180°. Curved cross-sections are already known in the prior art; a part-circular section which terminates gently in the transition region, for instance tangentially to the loop ends, significantly reduces the wear with respect to known solutions.

In an important embodiment of the invention, it is proposed that the first receiving section and the second receiving section are separated by a connecting web for connecting the hook element to the jumping sheet. The connecting web fulfils two functions, namely on the one hand the connection of the hook to the jumping sheet and on the other hand the separation of the first receiving section from the second receiving section. The connecting web preferably divides the connecting web symmetrically.

The connecting web can be connected to the jumping sheet in numerous ways. With conventional trampolines, the use of rivets has proved to be satisfactory. The invention is, however, based on the further recognition that it can be advantageous if the hook is not rigidly fixed to the jumping sheet but can alter its angle within predetermined limits with respect to the jumping sheet. In use of the trampoline, the hook element is thus always situated at a favourable angle, at which friction can be kept minimal. In this connection, it has proved to be particularly advantageous if the connecting web has a connecting opening at its rear end, by means of which the hook is connectable to the jumping sheet. The opening is advantageously closed and a flexible loop extending from the jumping sheet engages through the opening.

The opening is generally arranged horizontally and preferably substantially in the plane of the jumping sheet. The hook element is thus advantageously pivotable upwardly and/or downwardly and therefore conveniently always aligned in the tensional direction of the respective loop section. An arrangement in which, in the inserted state of the strap section, one loop end is arranged above the connecting web and one loop end is arranged below the connecting web is considered to be structurally particularly favourable.

In addition to the required wear resistance of the hook elements, there is a significant further requirement in the reliability of the suspension in use of trampolines. In this connection, it can advantageously be provided that the hook element has two side walls, which prevent sliding or release of the strap section out of the hook element. The side walls preferably project substantially perpendicularly from the respective receiving section. Such a construction offers high reliability in conjunction with good handling of the trampoline. In particular, the loop ends are easily insertable into the respective receiving section.

The side walls advantageously broaden towards their free ends. Even in the event of rapid bouncing back after loading of the jumping sheet into the starting position, each strap section sits reliably in its associated hook element. Insertion of the strap section into the hook element is effected with the jumping sheet unloaded and is completely unproblematic, notwithstanding the broadened end.

Additionally or alternatively, the connecting web can also broaden towards its end connected to the jumping sheet. It offers the best connecting possibilities to the jumping sheet at its broad end and increased strength during use of the trampoline. The receiving sections, on the other hand, can be chosen to be narrower and preferably have, as previously described, a part circular rounded cross-section.

The hook element is preferably manufactured from plastic material. The hook element is preferably manufactured as an injection moulded component.

The object of the invention is further solved by a hook element for trampolines with a first receiving section for receiving a first loop end of a strap section and with a second receiving section for receiving a second loop end of the strap section, wherein the first and second receiving sections are arranged separated from one another such that the loop ends of the strap section inserted into the hook element in particular do not, or substantially not, contact one another. The receiving sections are advantageously arranged at substantially the same height.

Further advantageous embodiments of the hook element in accordance with the invention are to be found in the dependant claims. Significant advantages of the hook element have also been indicated in conjunction with the description of the trampoline in accordance with the invention.

BRIEF DESCRIPTION OF DRAWINGS

The invention will be explained below in more detail by way of a preferred exemplary embodiment in conjunction with the attached drawings, in which.

DETAILED DESCRIPTION

Figure 1:
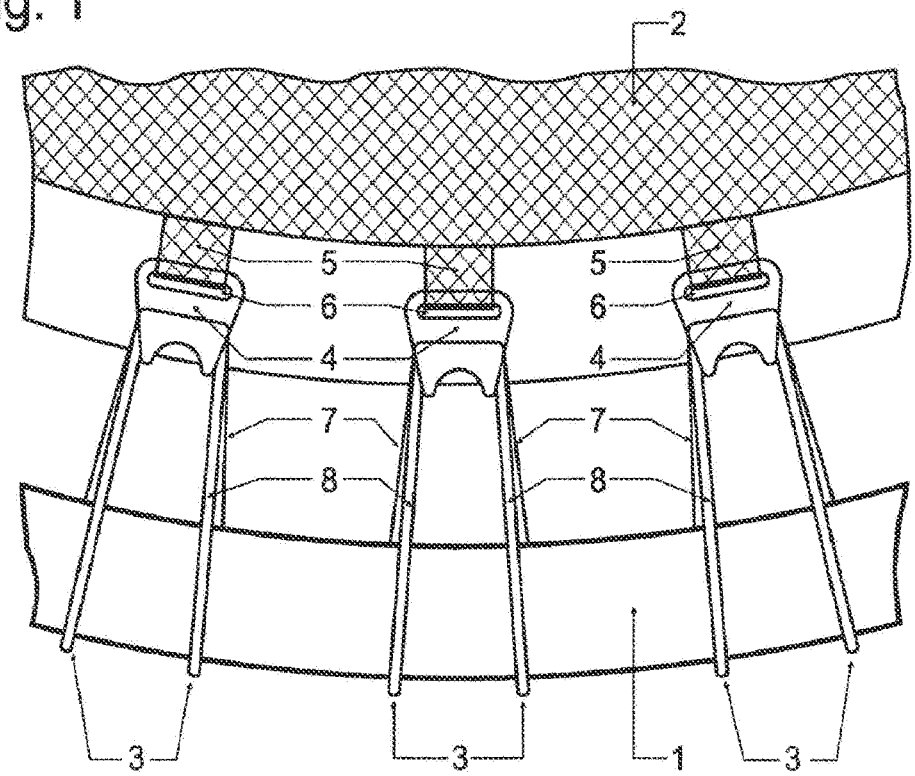
FIG. 1 is a view from below of a section of a trampoline in accordance with the invention.

FIG. 1 is a view from below of a section of a trampoline in accordance with the invention. It includes a frame (1) and flexible jumping sheet (2), which is connected to the frame by means of annular strap sections (3). The strap sections (3) are elastic strap rings with a rubber core and a sheath of a textile or plastic braid.

Fastened to the underside of the jumping sheet (2) are hook elements (4), whereby loops (5) are sewn to the jumping sheet, which is each pass through an opening (6) in the hook element. The hook element (4) is thus movably and, in particular, pivotably connected to the jumping sheet (2). Alternatively, the hook elements (4) can also be fastened externally to the jumping sheet (2). However, they are then not protected from above by the jumping sheet (4) or a cover associated with the jumping sheet so that fastening to the underside is thus preferred.

The strap sections (3) are looped around the frame (1) of the trampoline such that in each case one loop end (7, 8) is inserted into the hook element (4). In the illustrated exemplary embodiment, the loop end (7) is arranged above the loop end (8). It is basically provided in accordance with the invention that the loop end (7, 8) do not contact one another.

Figure 2:
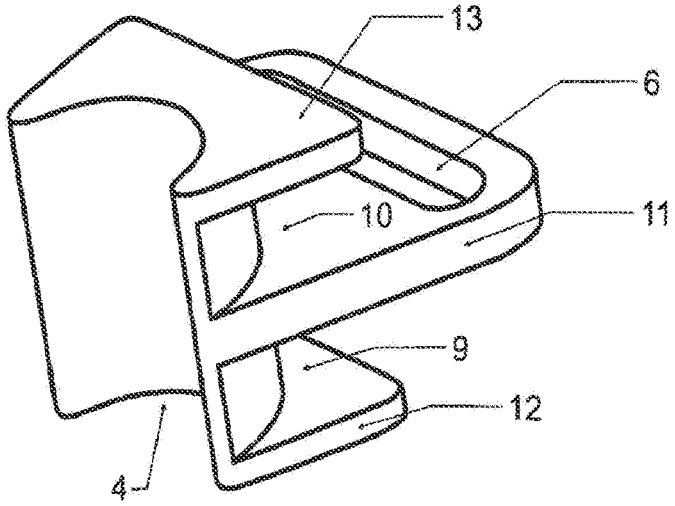
FIG. 2 is a perspective view of the hook element in accordance with the invention.

Reference is made to FIG. 2, in which the hook element (4) in accordance with the invention is shown in a perspective view and on an enlarged scale. The hook element (4) has two receiving sections (9, 10), into which the strap section (not shown) is inserted. The two receiving sections (9, 10) are separated from one another by a fastening web (11), which includes the opening (6) already discussed above in FIG. 1 in its rear end for fastening to the jumping sheet.

Arranged on each side is a side wall (12, 13), which projects perpendicularly from the associated receiving section (9, 10) and ensures that an inserted strap remains securely in the receiving sections, even when the trampoline is being used.

Figure 3:
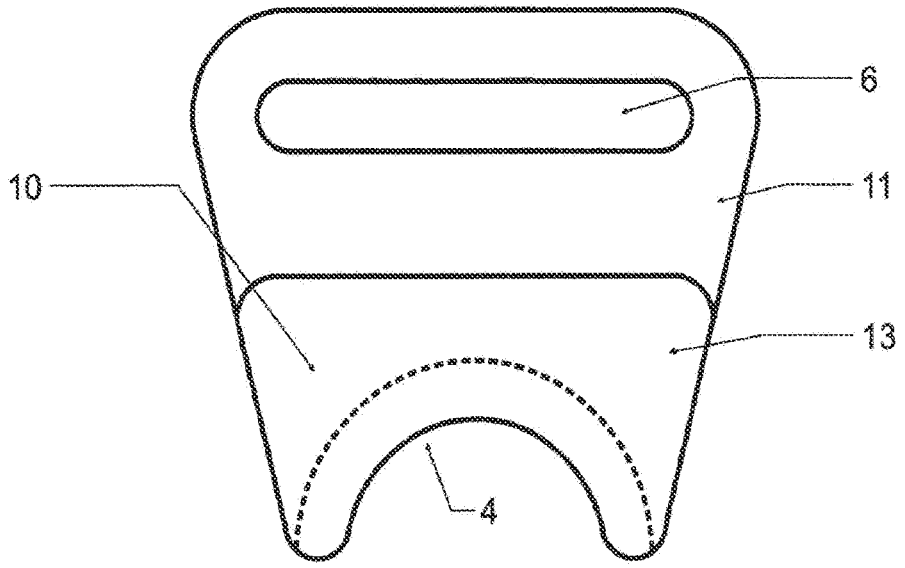
FIG. 3 is a first side view of the hook element in accordance with the invention.
Figure 4:
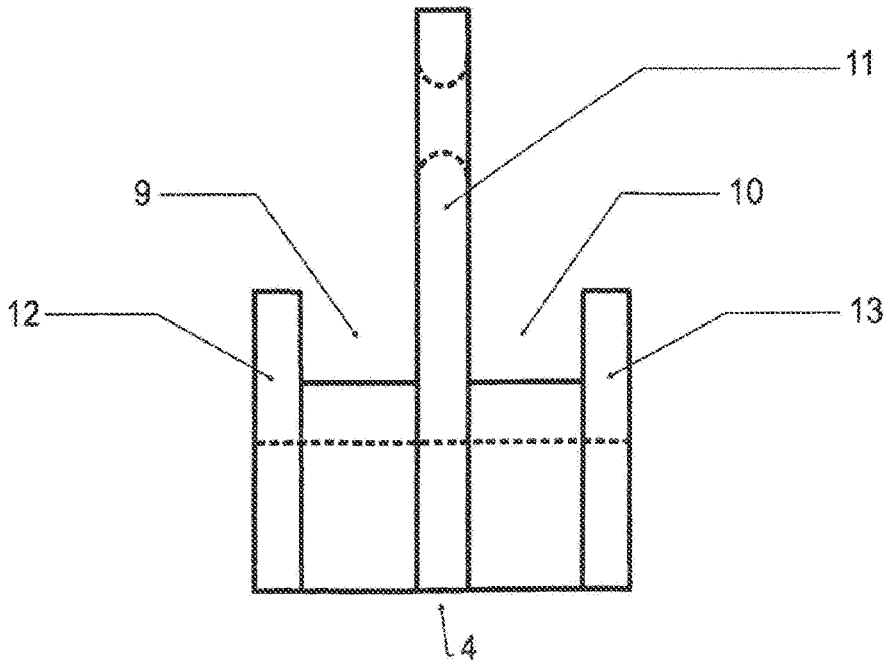
FIG. 4 is a second side view of the hook element in accordance with the invention.

FIGS. 3 and 4 are side views of the hook element (4) in accordance with the invention. Both the side walls (12, 13) and also the fastening web (11) broaden towards their free end. This ensures a secure grip of the strap sections in the receiving sections (9, 10). Easy accessibility for insertion and removal is ensured at the same time.

As may be seen, in particular, in FIG. 3, the receiving sections (9, 10), of which only the receiving section (10) is shown here, are of rounded shape, that is to say of part-circular shape in cross-section. The received loop ends are thus subject to very little frictional resistance and can slide with very little abrasion.

LIST OF REFERENCE NUMERALS

1 Frame
2 Jumping sheet
3 Strap section
4 Hook element
5 Loop
6 Opening
7 Loop end
8 Loop end

9 Receiving section
10 Receiving section
11 Fastening web
12 Side wall
13 Side wall

The invention claimed is:

1. A trampoline including a base, which includes a frame and including, a jumping sheet, which has hook elements[, preferably] on [its] *a* lower side, wherein the jumping sheet is connected to the frame by means of a plurality of annular strap sections, which each extend at least partially around the frame and are inserted into the hook elements, *each annular strap section having two loop ends,* characterised in that, the hook elements have a first receiving section and a second receiving section, which are arranged separated from one another such that the two loop ends of the strap section, which are produced by the looping of a strap section around the frame and are inserted, respectively, into the first and second receiving sections of [the] *each* hook element, and the two loop ends do not[, or substantially do not,] contact one another.

2. A trampoline [is] *as* claimed in claim 1, characterised in that the first receiving section and the second receiving section are arranged substantially at the same height.

3. A trampoline as claimed in claim 1, characterised in that [the] *a* cross-section in [the] *a* region of the receiving sections is of part-circular rounded shape and [preferably] has an angle of at least 160°[, particularly of ca. 180°].

4. A trampoline as claimed in claim 1, characterised in that the first receiving section and the second receiving section are separated by a fastening web for fastening the hook element to the jumping sheet.

5. A trampoline as claimed in claim 4, characterised in that the fastening web has a [preferably] closed fastening opening at [its] *a* rear end *of the fastening web.*

6. A trampoline as claimed in claim 4, characterised in that in the inserted state of the strap section, one loop end is arranged above the fastening web and one loop end is arranged below the fastening web.

7. A trampoline as claimed in claim 1, characterised in that the hook element has two side walls, which prevent sliding of the strap section out of the hook element.

8. A trampoline as claimed in claim 7, characterised in that the side walls project substantially perpendicularly from [the associated] *each respective* receiving section.

9. A trampoline as claimed in claim 7, characterised in that [the side walls broaden] *each side wall has a free end, and each side wall broadens* towards [their] *its respective* free end.

10. A trampoline as claimed in claim 4, characterised in that the fastening web broadens towards [its] *an* end connected to the jumping sheet.

11. A trampoline as claimed in claim 1, characterised in that the hook element is manufactured in the form of an injection moulded component.

12. A trampoline including: a frame; a jumping sheet connected to the frame by at least one hook element, each hook element comprising: a first receiving section for receiving a first loop end of a strap section connected to the frame, a second receiving section for receiving a second loop end of the strap section, a connecting web for connecting the hook element to [an associated] the jumping sheet, and wherein the first and second receiving sections extend side by side and are separated from one another by said connecting web such that the loop ends of the strap section inserted into the hook element do not[, or substantially do not,] contact one another, and wherein the connecting web [is], *the first receiving section, and the second receiving section each has an oriented direction, and the connecting web has an* oriented [in] *direction that is* the same *as the oriented* direction [as are] *for* the first *receiving section* and *the* second receiving [sections] *section*.

13. A trampoline as claimed in claim 12, characterised in that the first and second receiving sections are arranged substantially at [the] *a* same height.

14. A trampoline as claimed in claim 12, characterised in that [the] *a* cross-section in [the] *a* region of the receiving section is of part-circular rounded shape and [preferably] has an angle of [ca.] 180°.

15. A trampoline as claimed in claim 12, characterised in that the connecting web has a [preferably] closed connecting opening at [its] *a* rear end *of the connecting web.*

16. A trampoline as claimed in claim 12, characterised in that the hook element has two side walls, which prevent sliding of the strap section out of the hook element.

17. A trampoline as claimed in claim 16, characterised in that the side walls project substantially perpendicularly from [the associated] *each respective* receiving section.

18. A trampoline as claimed in claim 16, characterised in that [the side walls broaden] *each side wall has a free end, and each side wall broadens* towards [their] *its respective* free [ends] *end.*

19. A trampoline as claimed in claim 12, characterised in that the connecting web broadens towards [its] *an* end connected to the jumping sheet.

20. A trampoline as claimed in claim 12, characterised in that the hook element is manufactured in the form of an injection moulded component.

21. A trampoline comprising:

a frame;

a trampoline sheet connected to the frame by a hook element, the hook element comprising:

a longitudinal axis;

a first receiving section for accommodating a first portion of a strap connected to the frame;

a second receiving section for accommodating a second portion of the strap, the first and second receiving sections extending at least partially side by side; and, a fastening web extending parallel to the longitudinal axis and connected to the trampoline sheet, wherein the fastening web is disposed between the first and second receiving sections.

22. The trampoline of claim 21 wherein the fastening web comprises an aperture for accommodating a strap secured to the trampoline sheet.

23. The trampoline of claim 22 wherein the [opening] *aperture* has a smooth upper surface.

24. The trampoline of claim 21 wherein the receiving sections are wider than is a width of the fastening web.

*25. The trampoline of claim 5 wherein a loop extending from the jumping sheet engages through the closed fastening opening.*

*26. The trampoline of claim 25 wherein the loop is sewn to the jumping sheet.*

*27. The trampoline of claim 26 wherein the closed fastening opening is arranged substantially in a plane of the jumping sheet.*

*28. The trampoline of claim 15 wherein a loop extending from the jumping sheet engages through the opening.*

*29. The trampoline of claim 28 wherein the loop is sewn to the jumping sheet.*

*30. The trampoline of claim 29 wherein the opening is arranged substantially in a plane of the jumping sheet.*

*31. The trampoline of claim 22 wherein the strap secured to the trampoline sheet extends from the trampoline sheet and engages through the aperture.*

*32. The trampoline of claim 31 wherein the strap secured to the trampoline sheet is sewn to the trampoline sheet.*

*33. The trampoline of claim 32 wherein the aperture is arranged substantially in a plane of the trampoline sheet.*

* * * * *